Oct. 16, 1956 R. STEENECK 2,767,243

MAGNETIC TAPE STORAGE OF INTELLIGENCE

Filed July 2, 1951 2 Sheets-Sheet 1

INVENTOR.
R. STEENECK

BY M. J. Reynolds

ATTORNEY

MAGNETIC TAPE STORAGE OF INTELLIGENCE

Filed July 2, 1951 2 Sheets-Sheet 2

INVENTOR.
R. STEENECK

BY M J Reynolds
ATTORNEY

United States Patent Office 2,767,243

Patented Oct. 16, 1956

2,767,243

MAGNETIC TAPE STORAGE OF INTELLIGENCE

Robert Steeneck, New York, N. Y., assignor to The Western Union Telegraph Company, New York, N. Y., a corporation of New York Application July 2, 1951, Serial No. 234,887

4 Claims. (Cl. 178—17.5)

The present invention relates to the storage and transcription of intelligence signals on magnetic tape, and more particularly to the storage and transcription of a plurality of intelligence signals on transverse sections of a magnetic tape.

For many purposes it is desirable to store intelligence signals. For instance, in printing telegraph systems, a train of permutation code signals representing telegraph characters are often stored as perforations in a paper tape. Such a system has many inherent limitations. For example, paper tape can conveniently be used only once, operating room noise produced by the punching apparatus is often excessive and the speed of operation of the system is relatively limited.

It has heretofore been suggested to use magnetic tape for storage of a plurality of intelligence signals. Previous arrangements have, however, had a number of disadvantages. More particularly, continuously moving tapes, which have been used in prior arrangements, require a large length of tape in which to store a given amount of information. Continuously moving tape also makes stopping the tape at a desired point in the recording period difficult.

Accordingly, it is an object of the invention to provide an improved system for storing a plurality of intelligence signals on a magnetic tape.

More particularly, it is an object of the invention to provide an improved system for economically storing a plurality of trains of intelligence signal pulses on a magnetic tape.

Another object of the invention is to provide magnetic tape storage apparatus for use in a printing telegraph system.

Still another object of the invention is to provide recording and transcribing apparatus for a magnetic tape storage system of the above type.

Further objects of the invention will appear from the following description.

For convenience, the invention will be described with reference to a five-unit permutation code telegraph system. However, it is to be understood that the invention is not limited to five-unit telegraph signals. The number of units may be more or less than five, as desired, and the signals need not be telegraph signals but may be of any other type, such as, for instance, signals employed in the operation of business and computing machines.

In accordance with the invention, the five-unit telegraph signals to be stored are recorded laterally across a magnetic tape in a direction substantially perpendicular to the direction of travel of the tape. A marking signal may be indicated by a recorded magnetic spot while a spacing signal may be indicated by the absence of a magnetic spot.

The spot recordings on the magnetic tape are made while the tape is stationary. Each group of spot combinations representing a telegraph character is spaced a given distance from the preceding group, the spacing being achieved by stepping the tape the given distance during the time interval between the recording of successive groups.

Transcription of the five-unit signals is accomplished by periodically stepping the tape past transcribing heads, voltages being induced in the transcribing heads in accordance with the spot combinations previously recorded on the tape. Each of the transcribing heads is connected to an individual amplifier. The amplified signals are employed to trip locking tubes from normal spacing conditions thereof to marking conditions. Absence of one or more recorded spots in a given group causes the locking tubes associated therewith to remain in the spacing conditions thereof, while the magnetized spots produce marking conditions in the locking tubes associated therewith. Each of the locking tubes is returned to the normal spacing condition thereof during the time intervals between successive steppings of the tape.

The invention will now be described in greater detail with reference to the appended drawing in which.

Figures 1, 2, 3, 4, 5:
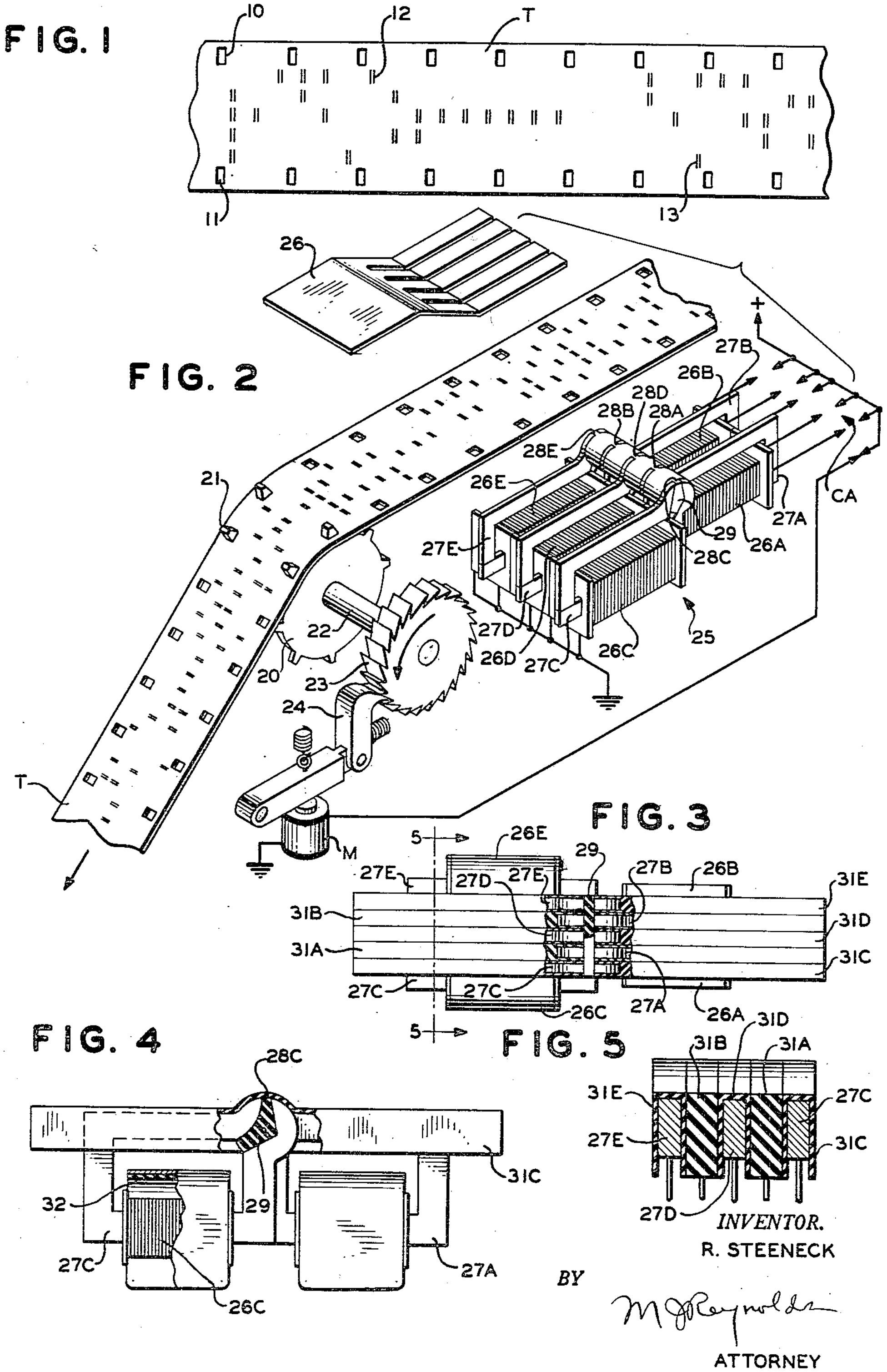
Fig. 1 illustrates a short length of magnetic tape.
Fig. 2 is an exploded view of the recording apparatus in accordance with the invention.
Figs. 3, 4 and 5 illustrate a recording or transcribing head in accordance with the invention.

Referring now to the drawing and more particularly to Fig. 1, a length of magnetic tape T is provided with equally spaced feed holes, such as 10 and 11, along the outer edges thereof. Magnetized spots on tape T are indicated by closely spaced parallel lines such as 12 and 13. It will be noted that there are five longitudinal rows of magnetized spots on tape T, each longitudinal row representing one unit of the five-unit telegraph code. Each transverse row represents a telegraph character, absence of a magnetized spot in a transverse row corresponding to a spacing signal. The transverse row of magnetized spots on the left end of tape T represents the letter V in the Baudot code, while the transverse row of magnetized spots on the right end of tape T represents the letter R. Instead of using a double row of feed holes, as in Fig. 1, a tape having a single row located near the center of the tape could conveniently be used. If it were desired to employ a wider tape for recording a large number of longitudinal rows, a tape having more than two rows of feed holes could conveniently be used.

In Fig. 2, which is an exploded view of a recording arrangement, a magnetic tape T is caused to advance toward the left by a pair of feed wheels 20 and 21 mounted on a shaft 22. Each of feed wheels 20 and 21 has projections on the peripheral surfaces thereof arranged to engage with the feed holes of tape T. A feed ratchet 23 mounted on shaft 22 is caused to rotate by a feed pawl 24. Each time feed pawl 24 is pulled downward, feed ratchet 23 rotates, the angle of rotation being chosen to advance tape T the desired distance between transverse rows of magnetized spots thereon. In a preferred embodiment of the invention, each time feed pawl 24 was pulled downward, tape T advanced 0.1 inch. Feed pawl 24 may be actuated by any suitable device, such as a cam or a stepping magnet. If a stepping magnet is employed, it is desirable that it be magnetically shielded to prevent magnetic flux therefrom from reaching tape T. In Fig. 2 there is illustrated diagrammatically a stepping magnet M arranged to be energized through a pair of normally closed contacts of a contact assembly CA. In this manner it can be assured that tape T will alternately be stepped and subjected to magnetization. The stepping will be accomplished on the front stroke of the stepping magnet armature.

Tape T is caused to contact with a recording head assembly 25 by a spring member 26. Assembly 25 comprises five recording coils 26A through 26E. Each of coils 26A through 26E are mounted on respective arms of magnetic circuits 27A through 27E. Each magnetic circuit is provided with a gap, 28A through 28E, respectively. One lead from each of coils 26A through 26E is connected to ground. The other leads from each of coils 26A through 26E are connected to respective contacts of contact assembly CA. Contact assembly CA is arranged selectively to provide positive battery to coils 26A through 26E and to setpping magnet M. The portions of magnetic circuits 27 adjacent gaps 28 are separated by an insulating member 29.

Contact assembly CA can be realized as any device for selectively energizing coils 26A through 26E in accordance with the code combination to be stored. For example, contact assembly CA could conveniently be realized as the selector bar controlled contacts on a keyboard telegraph transmitter of the type disclosed in U. S. Patent 2,135,377, issued November 1, 1938, to R. F. Dirkes et al.

An energized condition of one of coils 26 corresponds to a marking signal, while a deenergized condition of one of coils 26A through 26E corresponds to a spacing signal. Energization of one of coils 26A through 26E causes a magnetic flux to flow through the associated magnetic circuit 27 which, in turn, produces a magnetic field across the corresponding gap 28.

Each of gaps 28 is arranged adjacent to a respective longitudinal row on tape T so that the presence of a magnetic field across a particular gap will produce a magnetized spot in the appropriate longitudinal row of tape T.

Production of magnetized spots on tape T corresponding to a telegraph character is effected while the tape is stationary. Before the next character is stored, the tape is advanced the desired distance by actuation of pawl 24. Actuation of pawl 24 may be accomplished by any suitable mechanism such as, for instance, the stepping magnet and associated apparatus described in U. S. Patent 1,298,440, issued March 25, 1919, to George R. Benjamin.

Tape T, after having telegraph characters recorded thereon, may be stored in any suitable bin until it is desired to transcribe the characters therefrom, at which time it is passed through transcribing apparatus similar to the recording apparatus shown and described in connection with Fig. 2. In the trainscribing operation, magnetized spots on the tape, when drawn past the associated transcribing heads, cause voltages to be induced in the associated transcribing heads. It is evident that, in the transcribing operation, signals are derived from the tape while it is being stepped. The transcribing operation and apparatus therefor will be described more fully hereinafter in connection with Fig. 6.

The arrangement shown in Fig. 2 may be located at one point along the path of the magnetic tape to selectively magnetize the tape and another mechanism structurally similar to that shown in Fig. 2 may be located at another point in the path of travel to transcribe the intelligence characters from the tape. In the case of the recording mechanism, the contact assembly CA selectively energizes the coils 26 at a point in the stepping cycle when the tape is stationary. The stepping magnet M is then energized to step the tape which advances the desired distance and halts, at which time the contact assembly again energizes the coils. The contact assembly and the mechanism for activating stepping magnet M are of conventional construction and may be of the type disclosed in the patents referred to above.

Figure 6:
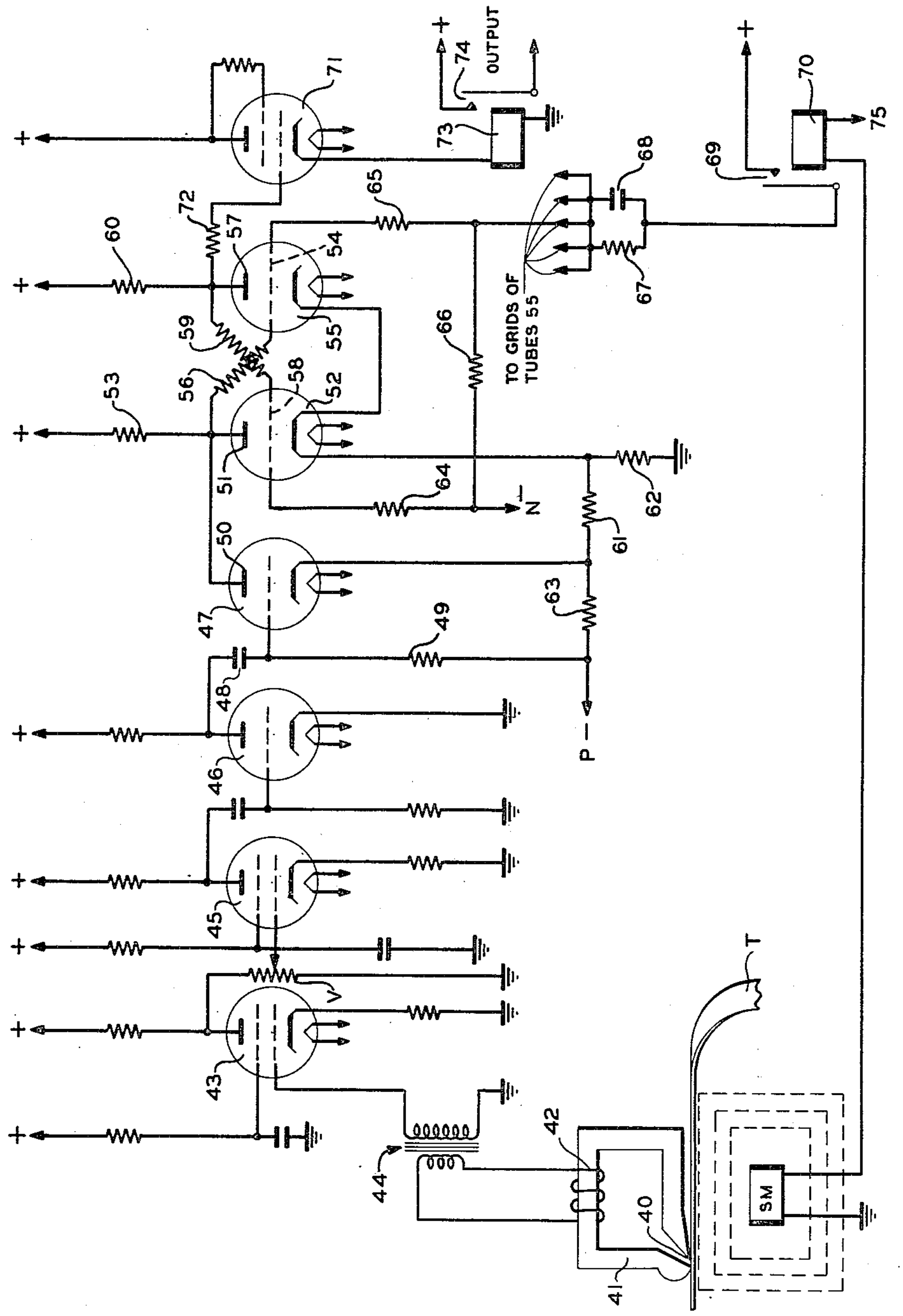
Fig. 6 illustrates a transcribing amplifier and associated apparatus according to the invention.

In the case of the transcribing mechanism which is also similar in construction to that shown in Fig. 2, the tape is stepped past coils which instead of being connected to a contact assembly CA are connected to circuits such as shown in Fig. 6. The stepping mechanism is of the same construction as in the case of recording. The tape is periodically stepped past the transcribing coils to induce voltages therein which control the circuits associated with the coils. It might be pointed out that the tape may have a loop or slack section between the recording mechanism and the transcribing mechanism so that the two stepping mechanisms may advance their respective sections of the tape independently.

The recording and transcribing heads may be identical. However, the magnetic circuit of the recording head is preferably composed of a low permeability material such as silicon steel which requires a high flux density for saturation. The transcribing head, on the other hand, is preferably composed of a high permeability material which requires only a low flux density for saturation.

Figs. 3 and 4, which illustrate in detail a recording or transcribing head assembly, are, respectively, plan and side elevation views of a recording head assembly. In Fig. 3 there are shown five parallel tracks, 31A through 31E. These tracks, which were omitted from Fig. 2 for clarity, serve as a bottom guide for the magnetic tape. The tracks are preferably composed of a nonmagnetic nonconductive material such as Bakelite, and are slightly wider than the longitudinal rows on the magnetic tape.

Also shown in Fig. 3 are portions of coils 26A, 26B, 26C and 26E, together with portions of magnetic circuits 27C and 27E. Shown in section in the center of Fig. 3 is a portion of the insulation 29 separating the magnetic circuits. It is evident that three coils and their associated magnetic circuits are located on the left hand side of insulation 29, while two coils and their associated magnetic circuits are located on the right hand side of insulation 29. This staggered arrangement permits economical use of the transverse dimension of the magnetic tape.

In Fig. 4 there is shown coils 26A and 26C together with their respective magnetic circuits. The upper portions of the magnetic circuits are separated and protected by vertical extensions of tracks 31. In Fig. 4, only track 31C can be seen. Also shown in Fig. 4 are insulation 29 and gap 28C in magnetic circuit 27C. As illustrated in Fig. 4, the actual windings of coils 26 are protected by a cover of insulating material 32 which might be, for instance, cardboard.

Fig. 5, which is a cross section of Fig. 3 taken along a line 5—5, shows the vertical extensions of tracks 31. These vertical extensions serve to provide insulation between the various magnetic circuits.

As indicated hereinbefore, during the recording operation, current is supplied directly to the recording head coils from the keyboard transmitter, distributor or other source of telegraph signals, producing relatively strong magnetic fields across the magnetic circuit gaps. These fields produce magnetized spots on portions of the tape adjacent the gaps across which a field exists.

During the transcribing operation, the relatively weak magnetic fields produced by these spots are caused to induce voltages in the associated transcribing coils. As these voltages are relatively weak, they should be amplified before operating additional equipment. Furthermore, as the voltages produced by different magnetized spots may have different magnitudes, it is desirable that apparatus be provided to insure that the transmitted telegraph signal voltages have substantially equal magnitudes.

In Fig. 6 there is shown the transcribing assembly for one unit of the five-unit permutation code. The complete transcribing apparatus will require five assemblies of the type shown in Fig. 5, except that only one stepping magnet is required. The mechanical apparatus for stepping the tape may be identical with that shown in Fig. 2.

Referring now to Fig. 6, tape T, which has previously been subjected to a recording operation, is caused to step past a gap 40 of a magnetic circuit 41. Although it is necessary that the distance through which the tape advances in each step be the same as the distance advanced each step in the recording operation, it is not necessary that the rate of stepping be the same. It is desirable that the velocity of the tape during the stepping operation be as high as possible so that the voltage induced in a coil 42 wound around a leg of magnetic circuit 41 will be maximized.

Coil 42 is coupled to the control grid of an amplifying tube 43 through a transformer 44. Transformer 44 serves to match the relatively low impedance of coil 42 to the relatively high input impedance of tube 43.

Tube 43 is the first tube of a three stage cascade amplifier circuit comprising tubes 43, 45 and 46. A volume control potentiometer V is interposed between tubes 43 and 45. The anode of tube 46 is coupled to the control grid of a tube 47 through a capacitor 48. The control grid of tube 47 is returned to a source of negative potential P through a resistor 49 so that tube 47 is normally biased beyond cut-off. Tube 47 will not conduct unless a positive pulse of sufficient amplitude to overcome the cut-off bias is applied to the control grid thereof. Anode 50 of tube 47 is connected to anode 51 of a tube 52, both anodes 50 and 51 receiving positive operating potentials through a resistor 53.

Anode 51 is coupled to control grid 54 of a tube 55 through a resistor 56, while anode 57 of tube 55 is coupled to control grid 58 of tube 52 through a resistor 59. Anode 57 is returned to a source of positive operating potential through a resistor 60. The cathodes of tubes 52 and 55 are interconnected and connected to the junction of resistors 61 and 62. Resistors 61 and 62, together with a resistor 63, form a voltage divider network shunted between source of negative potential P and ground. The cathode of tube 47 is connected to the junction of resistors 63 and 61.

Control grid 58 of tube 52 is returned to a source of negative potential N through a resistor 64, while control grid 54 of tube 55 is returned to source N through series connected resistors 65 and 66. Control grid 54 is also coupled to a source of positive potential through resistor 65, the parallel combination of a resistor 67 and a capacitor 68 and normally open contacts 69 of a relay 70.

Tubes 52 and 55 constitute a cathode-coupled one-shot multivibrator circuit in which tube 55 is normally conducting and tube 52 is normally cut-off. This normal condition of the locking multivibrator circuit may be termed the spacing condition because a telegraph spacing signal will not be represented by a magnetized spot on tape T and hence will not produce a voltage pulse at the grid of tube 43. When a marking signal is recorded on the tape, a voltage pulse will be produced at the grid of tube 43, which pulse will be amplified by tubes 43, 45 and 46 and, when applied to the control grid of tube 47, will overcome the bias thereof and cause tube 47 to conduct. When tube 47 conducts, the consequent voltage drop across resistor 53 will produce a negative voltage pulse at anode 51 of tube 52, which negative pulse will be repeated at control grid 54 of tube 55, causing tube 55 to become nonconducting. The consequent rise in potential of anode 57 of tube 55 will be repeated at control grid 58 of tube 52, causing tube 52 to become conductive. The multivibrator circuit is now locked in its marking condition with tube 52 conducting and tube 55 cut off.

Anode 57 of tube 55 is coupled to the control grid of a tube 71 through a resistor 72. When the multivibrator circuit is in its spacing condition, the low anode potential of tube 55 will cut off tube 71. When the multivibrator circuit is in its marking condition, the high anode potential of tube 55 will render tube 71 conductive, thereby energizing a relay 73 in the cathode circuit of tube 71. When relay 73 is energized, positive battery will be applied to the output circuit through normally open contacts 74. The output circuit may be connected to a distributor or other telegraph apparatus as desired.

As was pointed out hereinbefore, a marking signal recorded on tape T and passed under gap 40 causes the multivibrator circuit to transfer from its spacing to its marking condition and to lock in the marking condition. In order to respond to the next character component as the tape is stepped again, the multivibrator must be returned to its normal or spacing condition. This is accomplished by applying positive battery to the grid of tube 55 through normally open contacts 69, capacitor 68 and resistor 65. This reset circuit is completed when relay 70 is energized, thereby closing contacts 69. Relay 70 is in series with stepping magnet SM and is energized when a stepping pulse is applied to terminal 75. The stepping pulse might be derived, for example, from a distributor or other source of accurately timed pulses.

When a positive pulse is applied to control grid 54 of tube 55, tube 55 is rendered conductive and tube 52 is cut off, placing the multivibrator circuit in its spacing condition. The reset pulse through capacitor 68 is also applied to the control grids of the tubes in the other channels corresponding to tube 55 in the channel illustrated, thereby resetting all the multivibrators. By the time tape T has been stepped so that the next recorded combination passes under the transcribing heads, the charge on capacitor 68 will have equalized to a sufficient extent to free each of the multivibrator circuits to be set to marking or left in spacing conditions as determined by the recorded pulses of the next combination. When relay 70 is released, capacitor 68 discharges through resistor 67 so that capacitor 68 will be ready again to transmit a reset pulse.

After the tape has passed through the transcribing assembly, the magnetized spots may be removed therefrom by passing the tape through a suitable direct or high frequency field, thereby rendering the tape reusable. In practice, however, it is found desirable to erase the information by passing the tape through a strong permanent magnet field. This leaves the tape biased and, if poled correctly, will increase the size of the transcribed pulse.

While the invention has been described in a particular embodiment thereof and in particular uses, it is not desired that it be limited thereto for many modifications and uses thereof will occur to those skilled in the art without departing from the spirit and scope of the invention as set forth in the appended claims.

What is claimed is:

1. In a system of the character described wherein intelligence characters having at least three signal components are stored on a periodically stepped magnetic tape, a transducer device comprising at least three electromagnets, each of said electromagnets including a ferromagnetic member forming a magnetic circuit having a nonmagnetic gap and a coil wound about a portion of said member, said electromagnets being arranged so that the nonmagnetic gaps are adjacent said tape and disposed in a straight line perpendicular to the direction of travel thereof, the said coils being staggered whereby alternate coils are located on opposite sides of the line formed by said nonmagnetic gaps and corresponding portions of said ferromagnetic members being interleaved.

2. In a system of the character described wherein intelligence characters having a predetermined number of signal components are stored on a periodically stepped magnetic tape, a translating device comprising a plurality of electromagnets of said predetermined number, each of said electromagnets including a magnetic circuit comprising a flat ferromagnetic member having a lower horizontal arm, an upper arm and at least one vertical arm, a nonmagnetic gap separating one end of said upper arm from the upper end of said vertical arm, a coil wound about the lower arm of each of said magnetic circuits, said electromagnets being arranged whereby the nonmagnetic gaps are adjacent said magnetic tape and disposed in a straight line perpendicular to the direction of travel thereof, corresponding vertical arms of the magnetic circuits being interleaved and the lower arms of alternate electromagnets extending in opposite directions whereby said coils are staggered on either side of the line formed by the nonmagnetic gaps.

3. In a system of the character described wherein intelligence characters having a predetermined number of signal components are stored on a periodically stepped magnetic tape, a translating device comprising a plurality of electromagnets of said predetermined number, each of said electromagnets including a magnetic circuit comprising a flat ferromagnetic member having a lower horizontal arm, an upper arm and at least one vertical arm, a nonmagnetic gap separating one end of said upper arm from the upper end of said vertical arm, a coil wound about the lower arm of each of said magnetic circuits, said electromagnets being arranged whereby the nonmagnetic gaps are adjacent said magnetic tape and disposed in a straight line perpendicular to the direction of travel thereof, corresponding vertical arms of the magnetic circuits being interleaved and the lower arms of alternate electromagnets extending in opposite directions whereby said coils are staggered on either side of the line formed by the nonmagnetic gaps, a plurality of nonmagnetic nonconducting members located above the upper arms of said magnetic circuits forming a guide for the magnetic tape, said nonmagnetic nonconducting members having depending portions projecting between adjacent upper arms of the magnetic circuits and an insulator positioned perpendicular to the axes of said coils and located within all of said nonmagnetic gaps.

4. In a system for storage of telegraph signals on a periodically stepped magnetic tape wherein each telegraph character comprises a combination of marking and spacing signal components of a predetermined number, a magnetic transcribing device comprising a plurality of electromagnets of said predetermined number, each of said electromagnets including a magnetic circuit comprising a flat ferromagnetic member having a lower horizontal arm, an upper arm and at least one vertical arm, a nonmagnetic gap separating one end of said upper arm from the upper end of said vertical arm, a transcribing coil wound about the lower arm of each of said magnetic circuits, said electromagnets being arranged whereby the nonmagnetic gaps are adjacent said magnetic tape and disposed in a straight line perpendicular to the direction of travel thereof, corresponding vertical arms of the magnetic circuits being interleaved and the lower arms of alternate electromagnets extending in opposite directions whereby said coils are staggered on either side of the line formed by the nonmagnetic gaps, stepping means to periodically step said magnetic tape past said nonmagnetic gaps, a plurality of amplifiers of said predetermined number, each of said amplifiers having an input circuit connected to a respective transcribing coil and an output circuit, a plurality of one-shot multivibrator circuits, each of said multivibrator circuits having a normal spacing condition and a marking condition, means coupling the output circuit of each amplifier to a respective one of said multivibrator circuits to shift the multivibrator circuit from the spacing condition to the marking condition in response to an induced voltage in the associated transcribing coil, means responsive to a marking condition of each multivibrator circuit to generate a marking impulse and means responsive to each successive stepping of said tape to reset the multivibrator circuits to their normal spacing condition.

References Cited in the file of this patent

UNITED STATES PATENTS

| | | |
|---|---|---|
| 2,195,192 | Schuller | Mar. 26, 1940 |
| 2,230,913 | Schuller | Feb. 4, 1941 |
| 2,531,642 | Potter | Nov. 28, 1950 |
| 2,546,829 | Malina | Mar. 27, 1951 |
| 2,550,427 | Potts | Apr. 24, 1951 |
| 2,554,835 | Malina | May 29, 1951 |
| 2,560,474 | Potts | July 10, 1951 |
| 2,564,403 | May | Aug. 14, 1951 |
| 2,618,709 | Eckert | Nov. 18, 1952 |